United States Patent
Gomadam et al.

(10) Patent No.: US 10,218,069 B2
(45) Date of Patent: Feb. 26, 2019

(54) TRACES BETWEEN PHASE ARRAY ANTENNA AND RADIO FREQUENCY INTEGRATED CIRCUIT IN MM WAVE SYSTEMS

(71) Applicant: Facebook, Inc., Menlo Park, CA (US)

(72) Inventors: Krishna S. Gomadam, San Jose, CA (US); Djordje Tujkovic, Mountain View, CA (US); Sanjai Kohil, Manhattan Beach, CA (US)

(73) Assignee: Facebook, Inc., Menlo Park, CA (US)

( * ) Notice: Subject to any disclaimer, the term of this patent is extended or adjusted under 35 U.S.C. 154(b) by 529 days.

(21) Appl. No.: 14/790,847

(22) Filed: Jul. 2, 2015

(65) Prior Publication Data

US 2017/0005408 A1 Jan. 5, 2017

(51) Int. Cl.
*H01Q 3/34* (2006.01)
*H01Q 3/28* (2006.01)
*H01Q 3/26* (2006.01)
*H01Q 21/00* (2006.01)

(52) U.S. Cl.
CPC ............. *H01Q 3/34* (2013.01); *H01Q 3/267* (2013.01); *H01Q 3/28* (2013.01); *H01Q 21/0006* (2013.01)

(58) Field of Classification Search
CPC ........ H01Q 3/2652; H01Q 3/267; H01Q 3/28; H01Q 3/30; H01Q 21/0006; H01Q 21/018; H01Q 21/0087; H01Q 3/26; H01Q 3/2605; H01Q 3/2611; H01Q 3/2658; H01Q 3/2682; H01Q 3/2694; H01Q 5/42; H01Q 21/0075; H01Q 21/0081; H01Q 21/06; H01Q 21/061; H01Q 21/064; H01Q 21/22; H01Q 21/225; H01Q 1/38; H01Q 1/52; H01Q 1/521; H01Q 1/523; H01Q 13/10; H01Q 13/103; H01Q 13/106; H01Q 3/32

See application file for complete search history.

(56) References Cited

U.S. PATENT DOCUMENTS

| | | | | |
|---|---|---|---|---|
| 4,613,869 A | * | 9/1986 | Ajioka | H01Q 3/443 342/371 |
| 5,276,452 A | * | 1/1994 | Schuss | H01Q 21/0025 342/371 |

(Continued)

FOREIGN PATENT DOCUMENTS

| | | |
|---|---|---|
| JP | 2005-184827 | 7/2005 |
| JP | 2007-151160 | 6/2007 |

OTHER PUBLICATIONS

PCT/US2016/061396, PCT Notification of Transmittal of the International Search Report and the Written Opinion of the International Searching Authority, or the Declaration, dated Aug. 8, 2017.

*Primary Examiner* — Vladimir Magloire
*Assistant Examiner* — Daniel P Malley, Sr.

(57) ABSTRACT

Systems and associated methods for improved beamforming of the phase array antenna are disclosed herein. In one embodiment, a communication system for wireless signals has a phase array antenna having a plurality of individual antennas and a plurality of electrically conductive traces. The individual traces electrically connect corresponding individual antennas with a transmitter. The lengths of individual traces Ti, Tk satisfy equation Abs ((Ti−Tk) mod ($\lambda$))<$\lambda$/B, where $\lambda$ is a wavelength of the wireless signal and $\lambda$/B is a fraction of $\lambda$.

10 Claims, 9 Drawing Sheets

(56) References Cited

U.S. PATENT DOCUMENTS

| | | | | |
|---|---|---|---|---|
| 6,400,318 | B1* | 6/2002 | Kasami | H01Q 3/2605 |
| | | | | 342/372 |
| 6,710,742 | B1* | 3/2004 | Meredith | H01Q 3/28 |
| | | | | 342/372 |
| 6,922,116 | B1* | 7/2005 | Gordon | H01Q 1/246 |
| | | | | 333/100 |
| 8,754,811 | B1* | 6/2014 | Uscinowicz | H01Q 3/267 |
| | | | | 342/375 |
| 2004/0120391 | A1* | 6/2004 | Lin | H04L 5/1423 |
| | | | | 375/219 |
| 2005/0134404 | A1* | 6/2005 | Kajiya | H01P 1/181 |
| | | | | 333/156 |
| 2011/0026624 | A1 | 2/2011 | Gummalla et al. | |
| 2012/0256805 | A1 | 10/2012 | Orihashi | |
| 2013/0079060 | A1* | 3/2013 | Pivit | H01Q 3/267 |
| | | | | 455/561 |
| 2014/0009364 | A1* | 1/2014 | Yehezkely | H01Q 21/0006 |
| | | | | 343/893 |
| 2016/0049995 | A1 | 2/2016 | Andre et al. | |
| 2017/0179612 | A1* | 6/2017 | Kamgaing | H01Q 21/22 |

\* cited by examiner

TRACES BETWEEN PHASE ARRAY ANTENNA AND RADIO FREQUENCY INTEGRATED CIRCUIT IN MM WAVE SYSTEMS

TECHNICAL FIELD

The present technology is generally related to the field of phase array antennas, more specifically to the field of reducing power losses and improving signal to noise ratio (SNR) for phase array antennas.

BACKGROUND

An antenna (e.g., a dipole antenna) typically generates radiation in a pattern that has a preferred direction, i.e., the generated pattern is stronger in some directions and weaker in other directions. When receiving electromagnetic signals, the antenna has the same preferred direction, i.e., received signal is strongest in the preferred direction. Therefore, signal quality (e.g., signal to noise ratio) can be improved by aligning the preferred direction of the antenna with a target receiver or a source of signal. However, it is often impractical to physically reorient the antenna and/or the exact location of the target may not be known. To overcome some of the above shortcomings of the antenna, a phase array antenna can be formed from a set of antennas to simulate a large directional antenna. An advantage of the phase array antenna is its ability to transmit/receive signals in a preferred direction (i.e., its beamforming ability) without physically repositioning or reorienting the antenna.

FIG. 1 is a schematic illustration of a phase array antenna system 10 according to prior art. The illustrated system has a phase array antenna 14 that includes four individual antennas 14$i$ that are set apart by a half wavelength ($\lambda$/2) of the transmitted signal. A transmitter 12 generates signals for the phase array antenna 10. The transmitter 12 includes a modulator that receives two inputs (a baseband signal and a carrier oscillator) and outputs a modulated radio frequency (RF) signal. For example, a baseband signal having a relatively low frequency can be modulated by a carrier oscillator having a relatively high frequency to produce the modulated RF signal. The resulting modulated RF signal is transmitted through a beamformer 20 that adjusts amplitude and phase of the RF signal by applying an amplitude adjustment (a$i$) and a phase shift ($\theta i$) to the RF signal. A combination of the amplitude and phase adjustment for each individual antenna 14$i$ is called a complex weight (w$i$) for that antenna. Since the resulting adjusted RF signal (i.e., adjusted by applying the complex weight) is generally a low power signal, power amplifiers 38$i$ amplify RF signal that leaves the beamformer 34. Amplified RF signals arrive at the individual antennas 14$i$, and are transmitted to surrounding space as a wireless signal. In the illustrated example in FIG. 1, the wireless signal is transmitted in a direction D, i.e., a front F of the wireless signal makes an angle $\alpha$ (angle of antenna or AoA) with respect to the plane of the antennas 14$i$. The desired direction D of the wireless signal can be achieved by, for example, programming the beamformer 20 such that $\theta 1 > \theta 2 > \theta 3 > \theta 4$ by appropriate $\Delta\theta$, such that the front F makes angle $\alpha$ (AoA) with the plane of the antennas 14$i$. Analogously, if the phase array antenna 14 is a receiver and a source of RF signal (i.e., a transmitter) is located in at AoA D', the distribution of $\theta i$'s can be adjusted such that the phase array antenna has a maximum sensitivity in the direction D'.

However, in addition to the desired, controlled changes to phase $\theta i$ of the individual antennas 14$i$, the system may introduce undesired changes to phase $\theta i$. For example, high frequency RF signals (e.g., GHz range) are characterized by short wavelengths (e.g., mm range wavelegths). Consequently, even a relatively small difference between the length Ti of transmission lines 19$i$ (e.g., mm or sub-mm differences) may result in appreciable deviation from the desired distribution of $\theta i$'s, which, in turn, causes errors in the AoA, loss of sensitivity, spurious/undesired lobes around the AoA, and other issues. One approach to minimize these issues is described in relation to FIG. 2 below.

FIG. 2 is a schematic view of a phase array antenna system 200 in accordance with prior art. The illustrated phase array antenna 14 includes seven individual antennas 14$i$ spaced apart by half wavelength ($\lambda$/2) of the transmitted signal. The transmitter 12 generates RF signals that are routed to the antennas 14$i$ through traces 29$i$. The signals in the individual traces 29$i$ can be phase shifted to produce desired AoA of the outgoing wireless signal. As explained above, differences in the length Ti among individual traces 29$i$ can introduce undesirable variations in the phase shifts ($\theta i$'s) of the individual antennas 14$i$, especially for the signals in the GHz frequency range. Therefore, with the illustrated conventional system, all traces 29$i$ have uniform length to eliminate/minimize the unwanted variability in the phase of signal transmitted through the traces. However, such uniform length must necessarily correspond to at least the distance from the transmitter 12 to the peripheral antennas 14$i$. As a result, the traces 29$i$ that connect the transmitter 12 with the centrally located antennas 14$i$ are longer than necessary, which causes additional signal power loss in these traces. Accordingly, it would be advantageous to provide traces that connect the transmitter/receiver with the antennas such that the changes of phase $\theta i$ caused by the traces are minimized, while not introducing an undesirable power loss.

DETAILED DESCRIPTION

The following disclosure describes various embodiments of systems and associated methods for minimizing unwanted variations in signal phase ($\theta$) of the individual antennas in a phase array antenna. Most phase array antennas require precisely controlled differences between the signal phase of the individual antennas to produce desired directivity (i.e., angle of antenna or AoA) of the wireless signal of the phase array antenna. The unwanted variations in θ cause errors and/or increase noise in the directivity of the phase array antennas. To achieve this coherence, conventionally the traces to the elements of the phase array were made to have equal length, dictated by the length of a trace to the most distant element of the array, i.e., all the traces had to be as long as the longest trace. As a result, the conventional approach causes undesired power losses for the centrally located traces that could have used shorter traces.

In some embodiments of the present technology, output pins of a Radio Frequency Integrated Circuit (RFIC) chip are connected by traces to individual antennas of the phase array antenna. The length of the traces is set such that a difference in the trace lengths for any two traces corresponds to a multiple of signal wavelength. Thus the traces leading to the elements (i.e., individual antennas) located centrally within the phase array antenna are shorter, and the traces to the peripheral and more distant elements of the phase array antenna are longer. However, sometimes the phase array antenna operates at variable signal wavelength, and the difference in trace length cannot be set at a precise multiple of wavelengths. Instead, a variation in the trace length can be permitted up to a certain value, e.g., up to a quarter wavelength or up to an eighth wavelength (i.e., $\lambda/4$ or $\lambda/8$). The resulting error can be corrected by utilizing a beamforming that takes into account the trace length mismatch, for example, an optimal beamformer that uses the best DFT vector.

Figure 3A:
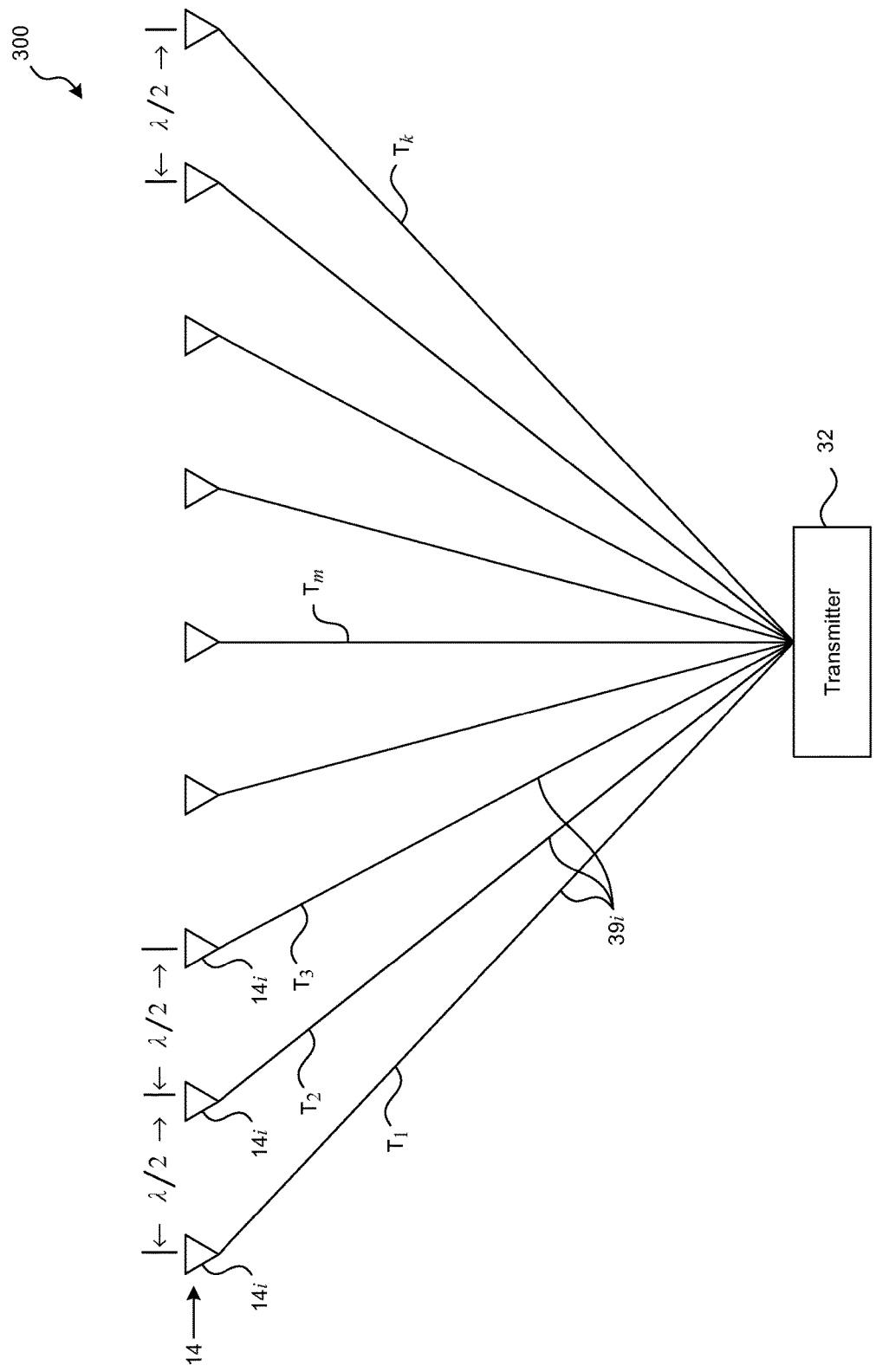
FIG. 3A is a schematic view of a phase array antenna 300 in accordance with an embodiment of the present technology.

FIG. 3A is a schematic view of a phase array antenna system 300 in accordance with an embodiment of the present technology. The illustrated embodiment of a phase array antenna 14 includes nine antennas 14i that are spaced apart by $\lambda/2$, but other number of antennas 14i and other distances between the individual antennas are also possible. In general, when the distance between the individual antennas is about $\lambda/2$, the undesirable side lobes are eliminated for the directivity of the phase antenna array. Traces 39i that connect a transmitter 32 (e.g., an RFIC chip) to the individual antennas 14i can be selected such that a difference in lengths Ti between any two traces 39i is a whole multiple of the signal wavelength $\lambda$. Such a condition can be expressed as:

$$(Ti-Tk)\bmod(\lambda)=0 \qquad \text{(Equation 1)}$$

where "mod" is a modulo operand that calculates the remainder (R) after dividing one number by another. When modulo operand results in zero, the argument to the left of the operator is a whole multiple of the argument to the left of the operand. In practical applications, the remainder that is sufficiently close to zero may be considered zero. For example, in some embodiments of the present technology the remainder that is smaller than $\lambda/10$ or $\lambda/100$ may be considered close to zero or being substantially zero. In some embodiments, the transmitter 32 (e.g., the RFIC chip) can include a beamformer (not shown for simplicity).

However, if $\lambda$ is not constant (e.g., $\lambda$=5.1, 5.0, 4.8, 4.6 mm for signal with frequency 58.32, 60.48, 62.64, 64.80 GHz, respectively) then (Ti−Tk) mod ($\lambda$) will be non-zero for at least some operational $\lambda$'s. Therefore, in some embodiments of the present technology, trace lengths Ti can be selected such that the value of remainder R does not exceed defined limits. For example, the value of remainder R can be defined as a fraction of wavelength $\lambda$ that is not to be exceeded for any pair of traces Ti and Tk, as in Equation 2 below.

$$\text{Abs}((Ti-Tk)\bmod(\lambda))<\lambda/B \qquad \text{(Equation 2)}$$

where Abs is an absolute value operator and B is a number that defines what fraction of $\lambda$ is used as the upper limit of the expression on the left hand of Equation 2.

Figure 3B:
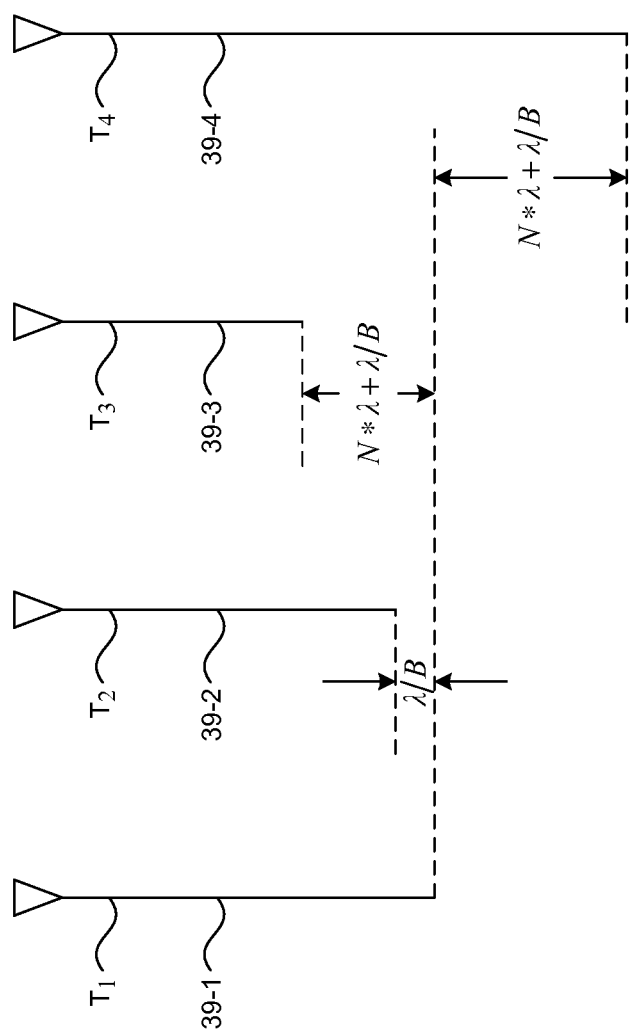
FIG. 3B is a simplified diagram of the trace lengths in accordance with an embodiment of the present technology.

FIG. 3B is a simplified diagram of the trace lengths in accordance with an embodiment of the present technology. In the illustrated embodiment, a trace 39-1 has length T1 and a trace 39-2 has a length T2. The difference between T1 and T2 is $\lambda/B$, where B can be, for example, 2, 4 or 8. Therefore, traces 39-1 and 39-2 satisfy Equation 2 in limit (i.e., if the difference in trace length is up to $\lambda/B$). Furthermore, a trace 39-3 has a length $N*\lambda+\lambda/B$, where N is a whole number, i.e., $N*\lambda$ is a whole multiple of $\lambda$. Therefore, a pair of traces 39-1 and 39-3 will also satisfy Equation 2 in limit. A person having ordinary skill would recognize that other pairs of illustrated traces 39-1 to 39-4 will also satisfy Equation 2. Other combinations of trace length are also possible, for example, T3 being up to $\lambda/B$ longer than T1; T3 being up to $N*\lambda-\lambda/B$ shorter than T1; and T4 being up to $N*\lambda+\lambda/B$ longer than T1. Four traces are shown in FIG. 3B for illustration, but other number of traces and the corresponding antennas is also possible.

When the pairs of traces 39i having lengths Ti, Tk satisfy Equation 2, a degradation of a beamformer gain for different wavelengths $\lambda$ is limited. An example comparison of the degradation of the beamformer gain versus an ideal beamformer gain of the phase array antenna is shown in Table 1 below.

TABLE 1

| Gain in dB | Ideal | $\lambda/8$ | $\lambda/4$ | $\lambda/2$ |
| --- | --- | --- | --- | --- |
| 2 bits phase | 14.7 | 14.5 | 14 | 10.5 |
| 3 bits phase | 15.3 | 15.2 | 14.6 | 10.8 |
| 4 bits phase | 15.5 | 15.3 | 14.7 | 11.2 |
| 5 bits phase | 15.55 | 15.35 | 14.8 | 11.2 |

As shown in Table 1, the degradation of the gain of the phase array antenna is limited by the restrictions placed on the differences in trace lengths defined by Equation 2. For example, for a 2 bits phase (i.e., the phase of the signal changes by $2\pi/4$ increments), the ideal gain (i.e., modulus of zero) of the phase array antenna is 14.7 dB, whereas for the modulus of $\lambda/2$ the gain is 10.5 dB. Therefore, a degradation of the gain is 4.2 dB. However, if the modulus is limited to, e.g., $\lambda/8$ then the gain of the phase array antenna is 14.5, i.e., the degradation of the gain is only 0.2 dB when compared to the ideal gain of that particular phase array antenna. For a 5 bits phase (i.e., the phase of the signal changes in $2\pi/32$ increments), the ideal gain of the phase array antenna is 15.55 dB, whereas for the modulus of $\lambda/2$ the gain is 11.2 dB, and for the modulus of $\lambda/8$ the gain is 15.35 dB. Therefore, by reducing the limits of the modulus in Equation 2, the degradation of the gain of the phase array antenna is reduced from 4.35 dB (i.e., 15.55-11.2 dB) to 0.2 dB (i.e., 15.55-15.35 dB). For many practical applications, a degradation of the gain of less than 1 dB can be smaller than a degradation caused by a power loss associated with having identical length for all traces that connect the RFIC with the elements of the phase array antenna.

The above discussion of Equation 2 and Table 1 relates to changes in phase θ of the wireless signal. However, in general, in beamforming of the phase array antenna 14 both the phase and amplitude of each antenna element 14i are controlled. In some embodiments, controlling both phase and amplitude can adjust side lobes and can improve the AoA of the phase array antenna 14 more precisely than the control of phase alone. The combined relative amplitude ai and phase shift $\theta i$ for each element of the antenna is a complex weight wi (for the ith individual antenna 14$i$). A beamformer 20 for the phase array antenna applies this complex weight wi to the signal (i.e., the beamformer shifts the phase and adjusts the amplitude) for each element of the phase array antenna 14. Therefore, an optimal beamformer applies a set of complex weights wi that result in a maximum gain for the wireless signal.

In general, optimality of the beamforming is preserved as long as the phase offsets generated by the unequal trace lengths can be cancelled. In some embodiments of the present technology, the phase rotation caused by the ith trace having length Ti is $-2\pi Ti/\lambda$ for the trace lengths Ti that satisfy Equation 2. Therefore, if a set of the complex weights w'i is the optimal beamformer 20 for the phase array antenna 14 having the traces 39$i$ of equal length, then the optimal beamformer for the phase array antenna 14 having traces of unequal length applies the complex weights:

$$wi = \exp(j*2\pi Ti/\lambda)*w'i \quad \text{(Equation 3)}$$

where j is a unit imaginary number. The trace length can be calibrated by measuring the relative phases at the antennas when receiving a tone transmitted from broadside. Alternatively, the relative phases can be adjusted and the set of weights that maximize the received power can be determined.

The complex weights wi of the optimal beamformer can be quantized depending on how many bits of resolution are used for the phase of the signal. For example, for a 2 bits phase discretization, the signal phase changes in $2\pi/4$ increments, and the complex weights wi can be quantized using values from the set (0, $\pi/2$, $\pi$, $3\pi/2$). Similarly, for a 4 bits phase discretization, the signal phase changes in $2\pi/16$ increments, and the complex weights wi can be quantized using values from the set (0, $\pi/8$, $\pi/4$, $3\pi/8$, ... $7\pi/8$, $\pi$). Other sets for the complex weights wi can also be created depending on how many bits are used for the phase quantization.

Figure 4:
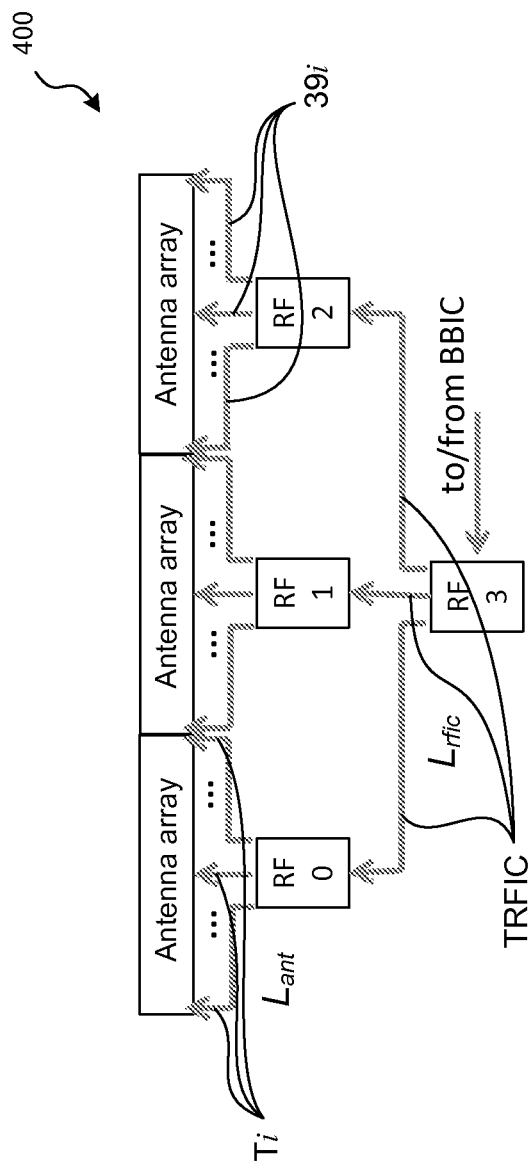
FIG. 4 is a schematic illustration of a tiled phase array antenna 400 in accordance with an embodiment of the present technology.

FIG. 4 is a schematic illustration of a tiled phase array antenna 400 in accordance with an embodiment of the present technology. In general, the systems and methods described with reference to FIG. 4 are applicable to high frequency multiple antenna systems. These systems and methods are described below in the context of the variation in the trace length. In the illustrated embodiment, signals from a baseband integrated circuit (BBIC) can be routed through a two-stage arrangement of RFIC's to a set of phase array antennas 440$i$. Signals from the RFIC3 in the first stage (e.g., a master RFIC) can be routed through sets of traces TRFIC to RFIC's 1-3 (e.g., a slave RFIC's) which then drive three phase array antennas 440$i$, but other numbers of RFIC's and other number of stages are also possible. In general, trace lengths are subject to manufacturing variations and/or tolerances that can reduce gain of the tiled phase array antenna 400. As explained above, in some embodiments of the present invention, the trace length from the RFIC to individual elements of the phase array antenna may be different by design, while the additional, manufacturing-induced variability of the trace length is a random variation. Taking into account the manufacturing-induced variability, relationship among the lengths of the traces can be expressed as:

$$Ti-Tj=Dij+Nij \quad \text{(Equation 4)}$$

where Dij is a known difference (e.g., set by the design) between the length of two traces i and j, and Nij is a random variation introduced by manufacturing errors/tolerances. For example, if the manufacturing errors/tolerances in trace length are about 1 mm and the signal frequency is 58.4 GHz, the resultant variability in the phase of the signal is about $+/-0.39\pi$. This variability is unaccounted for by the design and corresponds to about 70° phase shift. In at least some embodiments, such variability may cause significant degradation in the quality of beamforming.

Manufacturing-induced variability of the trace length can be eliminated or at least minimized with factory based calibration. For example, the phase array antenna can be placed into an anechoic chamber with auxiliary antennas located in a far field to measure relative phase differences between individual antenna elements. Knowing the relative phase differences, the phase shifts $\theta i$ can be adjusted to eliminate those relative differences. However, instrumenting the measurement setup for the above procedure and executing the measurements for each antenna can be costly in serial production.

In some embodiments of the present technology, an instrument-less calibration procedure capable of running within short time (e.g., sub-millisecond time) at a boot-up time can characterize manufacturing-induced phase differences between the traces. An additional advantage of the present technology is that, in at least some embodiments, the calibration is run only once for the life of antenna, and the results can be stored on non-volatile memory in the system, e.g., Electrically Erasable Programmable Read-Only Memory (EEPROM), flash memory, disk drive, or other type of non-volatile memory. In some embodiments of the present technology, the calibration method relies on reusing a continuous waveform (CW) generator that is already incorporated into RFIC for the purpose of calibrating receiver (RX) gain and/or IQ (in-phase and quadrature) imbalance. With the inventive technology, a relative calibration can be sufficient, that is, the phase shifts $\theta i$ can be adjusted/compensated to make Nij's (differences in the length of the traces i and j that were introduced by manufacturing error/tolerances) constant or close to constant for all i,j pairs. Accordingly, the calibration does not have to be absolute, that is, the calibration does not have to result in zero phase offset for each trace. Details of the compensation technology are described below with reference to FIG. 5.

Figure 5A:
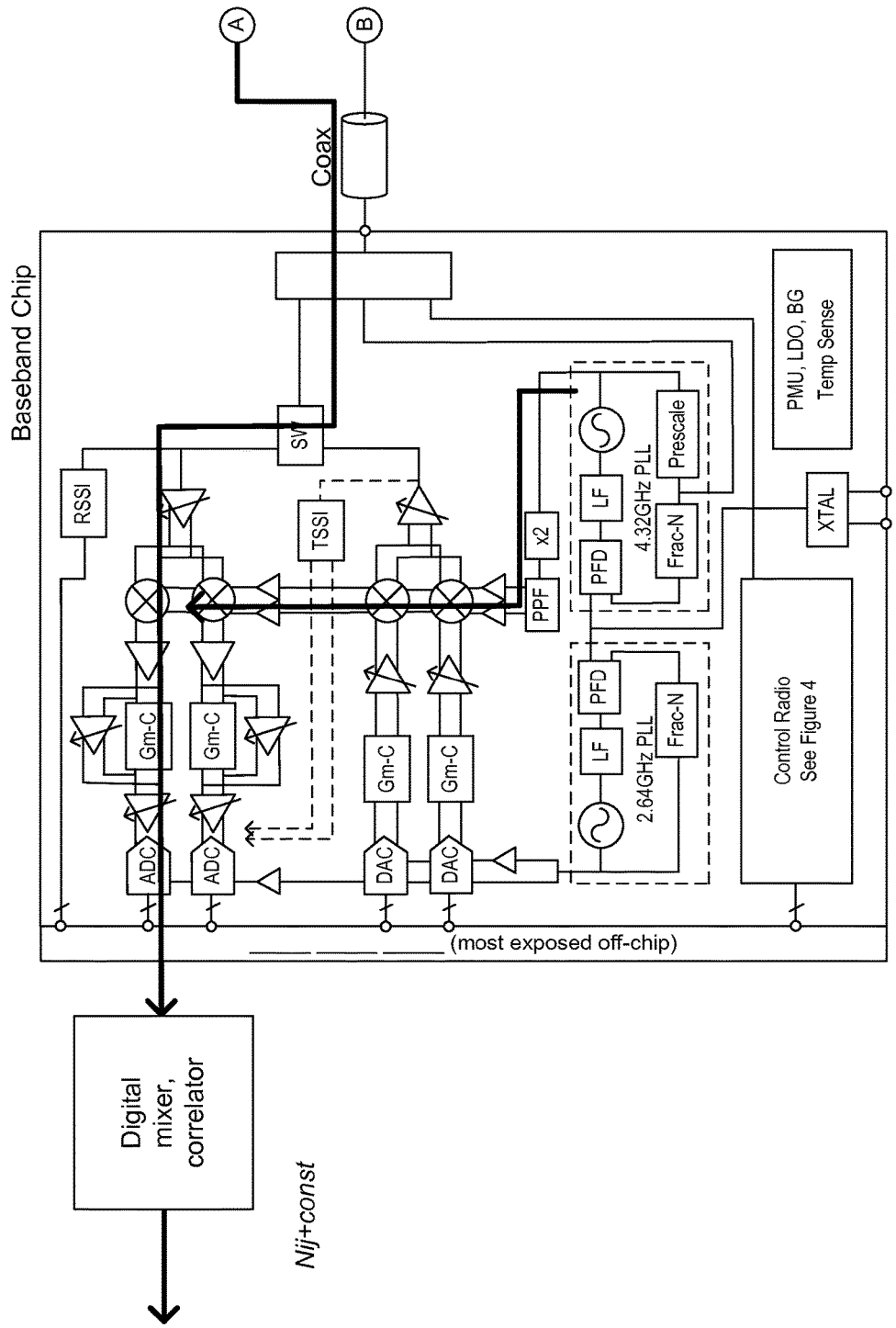
FIGS. 5A and 5B are schematic illustrations of a transceiver in accordance with an embodiment of the present technology.
Figure 5B:
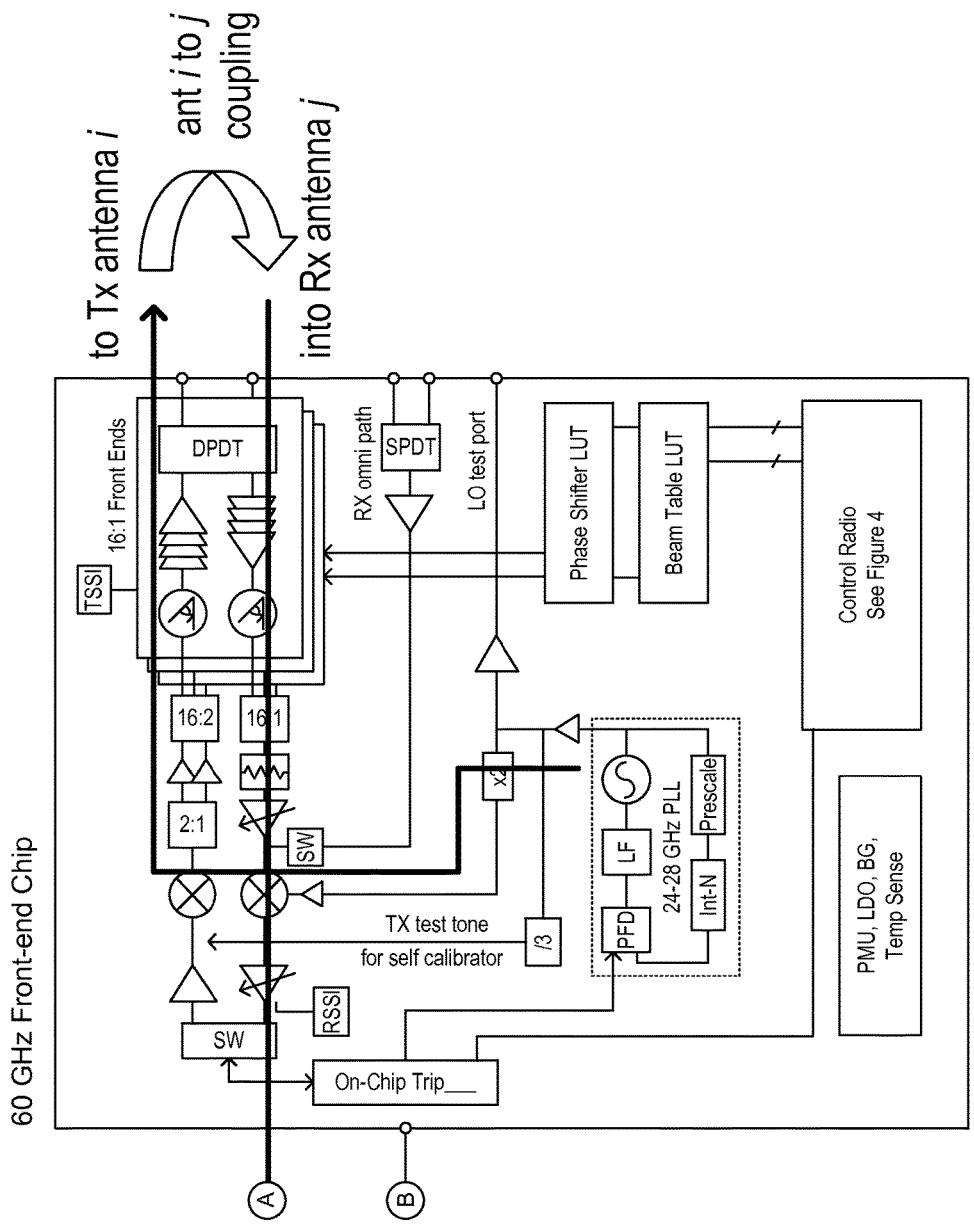

FIGS. 5A and 5B are schematic illustrations of a transceiver in accordance with an embodiment of the present technology. In an embodiment of the present technology, a phase-locked loop (PLL) of the RFIC can generate a calibration signal CW at, e.g., 8 GHz and inject it to a transmitter (TX) antenna. The injected signal can leak over the phase array antenna back to antenna j. In some embodiments, a leakage of about 18-20 dB is acceptable for the calibration. Next, the leakage signal can bypass a mixer circuit in the transceiver 500, and the calibration signal is routed through a coaxial cable back to baseband chip. In some embodiments, the baseband chip includes a complex mixer for frequency within $\lambda/D$ sampling rate. The sampled calibration signal CW can be correlated within the baseband chip to determine the phase shifts for the particular traces. In some embodiments, prior synchronization of baseband digital mixer to RF and baseband PLLs can be used to improve the accuracy of the determination of the phase shifts. The above calibration procedure can be repeated for all traces Ti. Furthermore, the calibration procedure can be extended to tiled phase array antennas by, for example, comparing all phase array antennas to the antenna at the edge of the tile.

Figure 1:
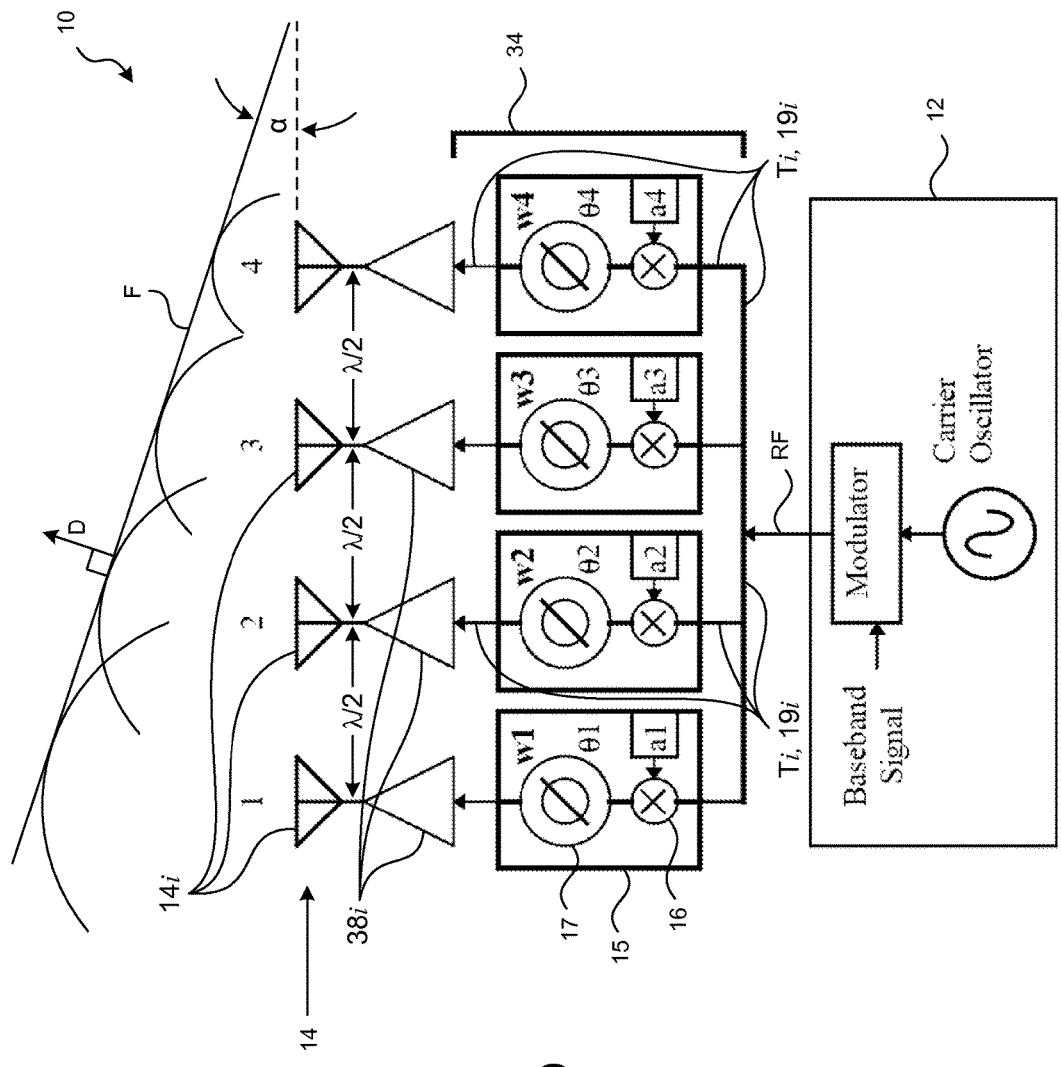
FIG. 1 illustrates a phase array antenna 10 according to prior art.
Figure 2:
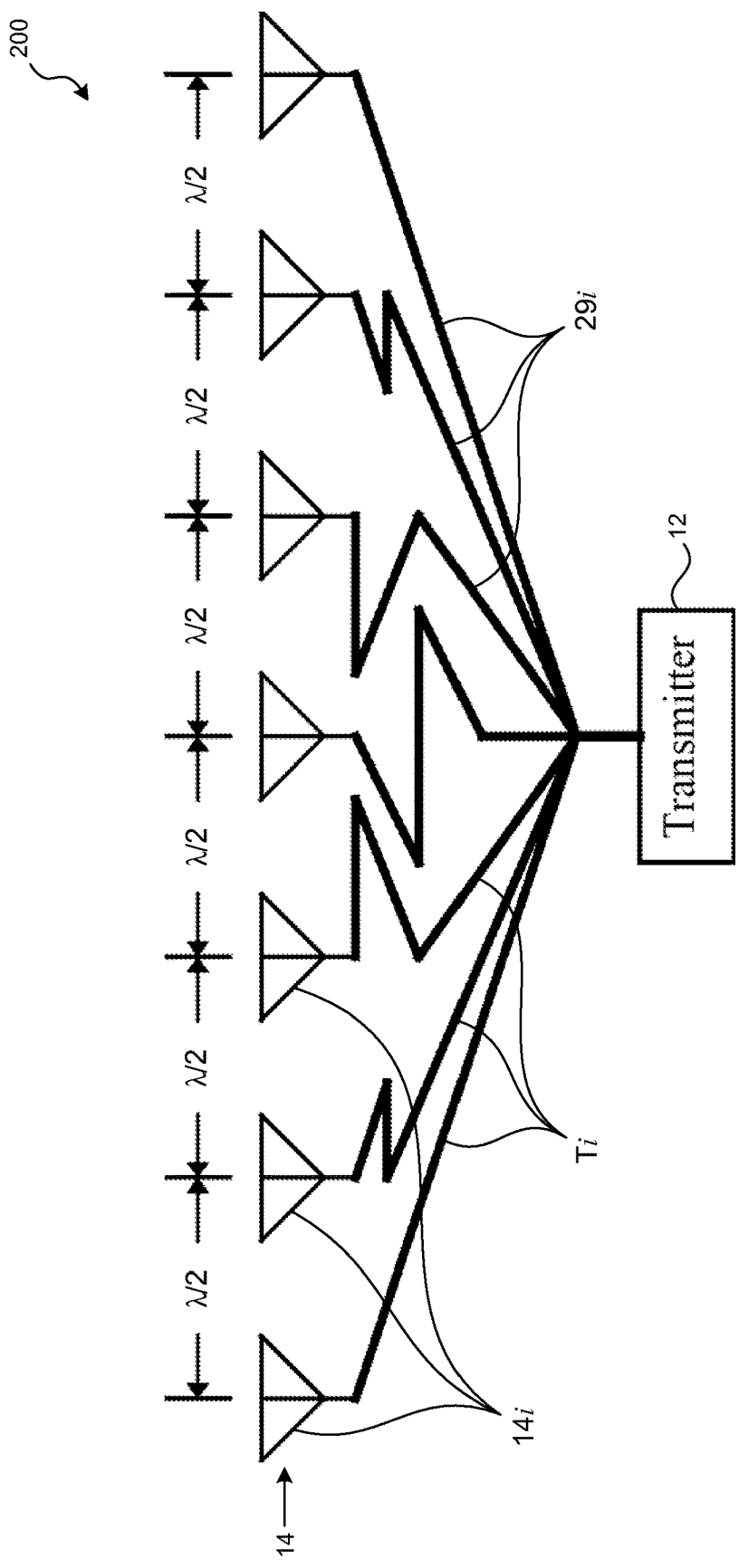
FIG. 2 is a schematic view of a phase array antenna 200 in accordance with prior art.
Figure 6A:
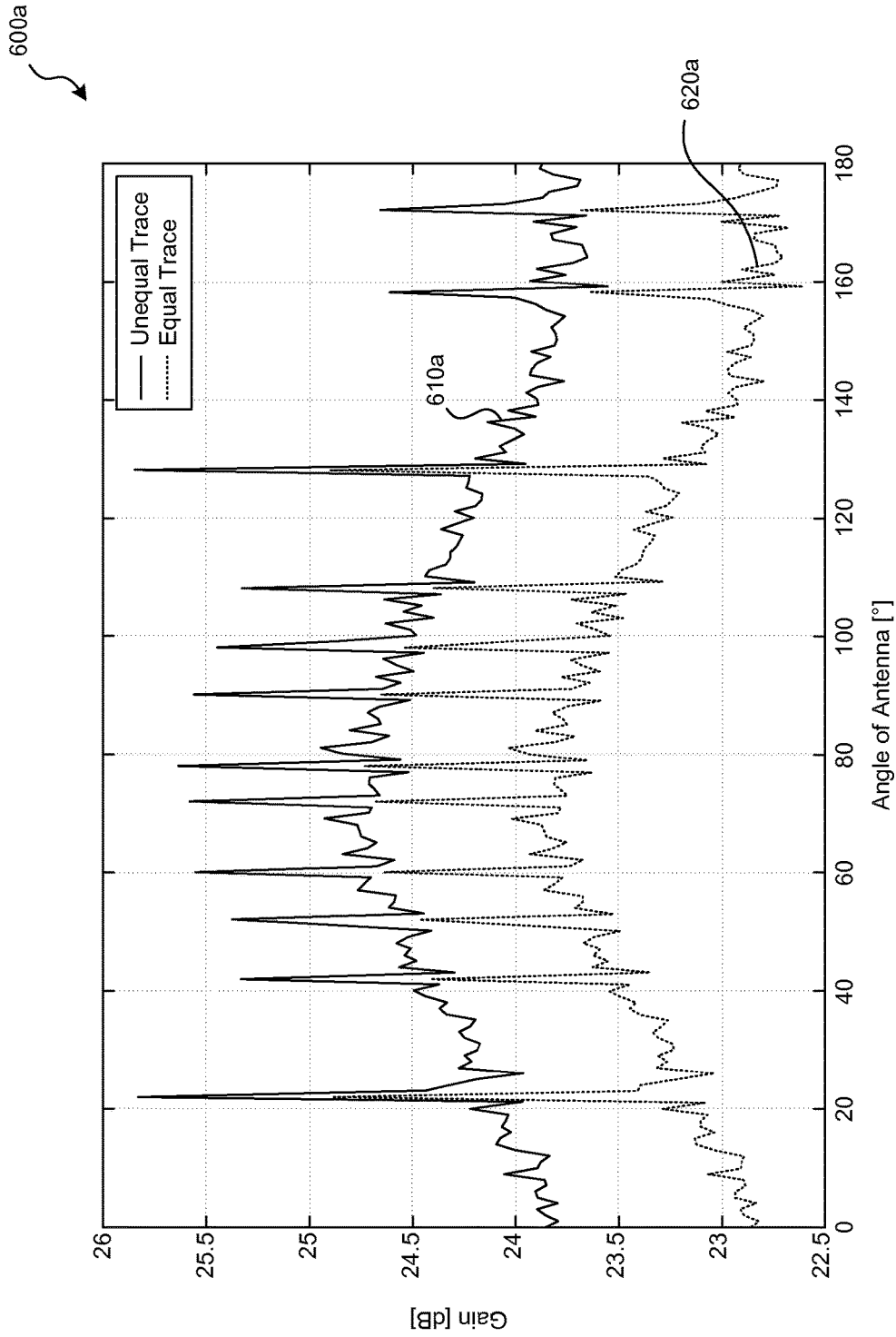
FIG. 6A is a graph of signal gain in dB for traces of equal and unequal length when the trace loss is 0.25 dB/cm.

FIG. 6A is a graph of signal gain in dB as a function of the AoA for a phase array antenna. Dashed line represents signal gain when traces have equal length, and solid line represents signal gain when the differences in trace length satisfy equation 2. In both cases, the phase array antenna has 32 elements and 5 bit phase resolution, and the trace loss is 0.25 dB/cm. As explained with relation to FIG. 2, the traces of equal length assure uniformity of phase shifts of the signal for all traces. However, when all traces have equal length at least some traces, e.g., centrally located traces, are longer than necessary, which causes additional power loss in the centrally located traces. Consequently, the signal gain for the phase array antenna with traces of equal length is smaller than the signal gain for the phase array antenna with traces of unequal length that satisfy equation 2. On average, signal gain of the phase array antenna having unequal trace length is higher for about 1 dB than the signal gain of the phase array antenna having equal trace length. In both cases, the sharp, concentrated peaks represent quantization errors.

Figure 6B:
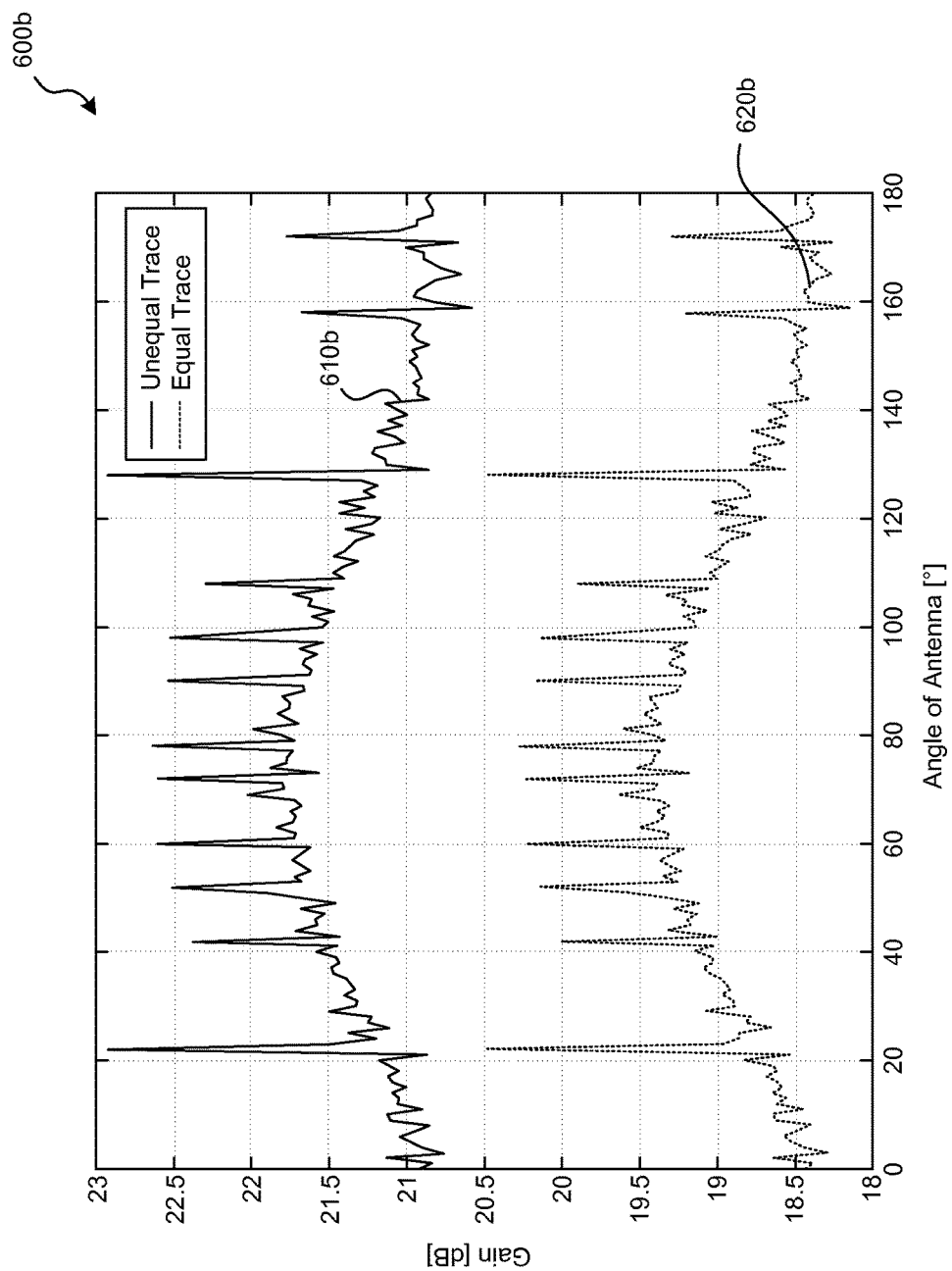
FIG. 6B is a graph of signal gain in dB for traces of equal and unequal length when the trace loss is 0.5 dB/cm.

FIG. 6B is another graph of signal gain in dB for a phase array antenna having traces of equal and unequal length. Here, the trace loss is 0.5 dB/cm, which is twice as much as the trace loss for the test cases illustrated in FIG. 6A. Therefore, the losses associated with the centrally located traces are even higher than in the test case illustrated in FIG. 6A. As a result, the signal gain for the equal trace case is about 2.5 dB smaller on average than the corresponding signal gain for the traces that satisfy equation 2.

From the foregoing, it will be appreciated that specific embodiments of the invention have been described herein for purposes of illustration, but that various modifications may be made without deviating from the scope of the various embodiments of the invention. For example, combinations of phase resolution and fraction of wavelength can be used that are different than those illustrated above. Furthermore, while various advantages and features associated with certain embodiments of the disclosure have been described above in the context of those embodiments, other embodiments may also exhibit such advantages and/or features, and not all embodiments need necessarily exhibit such advantages and/or features to fall within the scope of the disclosure. Accordingly, the disclosure is not limited, except as by the appended claims.

We claim:

1. A communication system for wireless signals, comprising:
   a phase array antenna having a plurality of individual antennas; and
   a plurality of electrically conductive traces connecting the plurality of individual antennas to an RFIC (Radio Frequency Integrated Circuit), wherein each individual trace of the plurality of electrically conductive traces is connected between a corresponding individual antenna of the plurality of individual antennas and the RFIC,
   wherein a remainder of a difference in lengths of any two individual traces Ti, Tk, divided by a signal wavelength $\lambda$ is less than a defined limit, wherein the defined limit is a fraction of $\lambda$;
   wherein conductive traces connected to individual antennas located centrally within the phase array antenna are shorter than conductive traces connected to individual antennas located at a periphery of the of the phase array antenna;
   where $\lambda$ is a wavelength of a wireless signal to be applied to the plurality of individual antennas.

2. The system of claim 1 wherein the plurality of individual antennas of the phase array antenna are spaced apart by $\lambda/2$.

3. The system of claim 1, further comprising the RFIC capable of transmitting signal through the plurality of conductive traces to the phase array antenna.

4. The system of claim 1, wherein the difference in lengths of individual traces Ti, Tk is substantially equal to a whole multiple of a signal wavelength $\lambda$, plus a margin, wherein the margin is less than $<\lambda/B$, wherein B is selected from a group consisting of 2, 4, 8 and 16.

5. The system of claim 1, further comprising a beamformer capable of performing amplitude and/or phase adjustment to the wireless signal to be applied to each individual trace.

6. The system of claim 5 wherein the beamformer is operates to cancel phase offsets generated by unequal trace lengths comprising:
   receiving a tone and measuring relative phases at the plurality of individual antennas;
   calibrating the unequal trace lengths based on the measured relative phases;
   determining complex weights based on the unequal trace lengths; and
   applying the complex weights to a wireless signal.

7. A communication system for wireless signals, comprising:
   a phase array antenna having a plurality of individual antennas;
   a plurality of electrically conductive traces connecting the plurality of individual antennas to an RFIC (Radio Frequency Integrated Circuit), wherein each individual trace of the plurality of electrically conductive traces is connected between a corresponding individual antenna of the plurality of individual antennas and the RFIC, wherein lengths of individual traces Ti, Tk have unequal trace lengths that cause phase offset errors among the individual antennas of the phase array antenna, wherein a remainder of a difference in lengths of any two individual traces Ti, Tk divided by a signal wavelength $\lambda$ is less than a defined limit, wherein the defined limit is a fraction of $\lambda$, wherein conductive traces connected to individual antennas located centrally within the phase array antenna are shorter than conductive traces connected to individual antennas located at a periphery of the of the phase array antenna, where $\lambda$ is a wavelength of a wireless signal to be applied to the plurality of individual antennas; and
   a beamformer configured to perform amplitude and/or phase adjustment to a wireless signal to be applied to each individual conductive trace, wherein the beamformer is configured to cancel the phase offsets among individual antennas of the phase array antenna.

8. A method for producing a phase array antenna, the method comprising:
   manufacturing traces for connections to individual antennas of the phase array antenna, wherein a remainder of a difference in lengths of any two of individual traces Ti, Tk divided by a signal wavelength $\lambda$ is less than a defined limit, wherein the defined limit is a fraction of $\lambda$, where $\lambda$ is a wavelength of a wireless signal to be applied to a plurality of individual antennas of the phase array antenna;
   electrically connecting each individual trace of the traces between a corresponding individual antenna of the plurality of individual antennas and an RFIC (Radio Frequency Integrated Circuit) wherein conductive traces connected to individual antennas located centrally within the phase array antenna are shorter than conductive traces connected to individual antennas located at a periphery of the of the phase array antenna.

9. The method of claim 8, further comprising connecting the traces to the phase array antenna to a beamformer, wherein the beamformer is operates to cancel phase offsets generated by unequal trace lengths comprising:
receiving a tone and measuring relative phases at the plurality of individual antennas;
calibrating the unequal trace lengths based on the measured relative phases;
determining complex weights based on the unequal trace lengths; and
applying the complex weights to a wireless signal.

10. A method for beamforming, comprising:
emitting a wireless signal from a phase array antenna having a plurality of individual antennas, wherein a plurality of conductive traces electrically connect individual antennas of the phase array antenna with an RFIC (Radio Frequency Integrated Circuit) have unequal trace lengths that cause phase offset errors among the individual antennas of the phase array antenna, wherein each individual trace of the plurality of electrically conductive traces is connected between a corresponding individual antenna of the plurality of individual antennas and the transceiver, wherein lengths of individual traces Ti, Tk have unequal trace lengths that cause phase offset errors among the individual antennas of the phase array antenna, wherein a remainder of a difference in lengths of any two individual traces Ti, Tk divided by a signal wavelength $\lambda$ is less than a defined limit, wherein the defined limit is a fraction of $\lambda$ where $\lambda$ is a wavelength of a wireless signal to be applied to the plurality of individual antennas wherein conductive traces connected to individual antennas located centrally within the phase array antenna are shorter than conductive traces connected to individual antennas located at a periphery of the of the phase array antenna; and
beamforming the RF signal of the phase array antenna, wherein the beamforming adjusts amplitude and/or phase of the wireless signal that is applied to individual conductive traces, and wherein the beamformer is configured to cancel the phase offsets among individual antennas of the phase array antenna.

* * * * *